United States Patent
Liu et al.

(10) Patent No.: US 9,302,914 B2
(45) Date of Patent: Apr. 5, 2016

(54) METHODS FOR MAKING HOLLOW CARBON MATERIALS AND ACTIVE MATERIALS FOR ELECTRODES

(71) Applicant: GM GLOBAL TECHNOLOGY OPERATIONS LLC, Detroit, MI (US)

(72) Inventors: Zhongyi Liu, Troy, MI (US); Qiangfeng Xiao, Troy, MI (US); Xingcheng Xiao, Troy, MI (US); Michael K. Carpenter, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 69 days.

(21) Appl. No.: 14/194,089

(22) Filed: Feb. 28, 2014

(65) Prior Publication Data
US 2015/0246816 A1  Sep. 3, 2015

(51) Int. Cl.
| | |
|---|---|
| B44C 1/22 | (2006.01) |
| C23F 1/00 | (2006.01) |
| C23F 3/00 | (2006.01) |
| C01B 31/04 | (2006.01) |
| H01M 4/04 | (2006.01) |
| H01M 4/13 | (2010.01) |
| H01M 4/36 | (2006.01) |
| H01M 4/62 | (2006.01) |
| C01B 31/02 | (2006.01) |
| H01M 4/02 | (2006.01) |
| H01M 4/38 | (2006.01) |
| H01M 4/48 | (2010.01) |
| H01M 10/052 | (2010.01) |

(52) U.S. Cl.
CPC ............ *C01B 31/04* (2013.01); *C01B 31/02* (2013.01); *H01M 4/0471* (2013.01); *H01M 4/13* (2013.01); *H01M 4/362* (2013.01); *H01M 4/625* (2013.01); *H01M 4/38* (2013.01); *H01M 4/387* (2013.01); *H01M 4/483* (2013.01); *H01M 10/052* (2013.01); *H01M 2004/021* (2013.01)

(58) Field of Classification Search
CPC .................................................. C01B 31/04
USPC ............................................................ 216/81
See application file for complete search history.

(56) References Cited

U.S. PATENT DOCUMENTS

| | | | |
|---|---|---|---|
| 7,718,156 B2 | 5/2010 | Zhang et al. | |
| 2002/0009639 A1* | 1/2002 | Miyake et al. | 429/218.1 |
| 2009/0208780 A1* | 8/2009 | Sun et al. | 429/12 |

FOREIGN PATENT DOCUMENTS

WO   WO2012/064702   5/2012

* cited by examiner

*Primary Examiner* — Roberts Culbert
(74) *Attorney, Agent, or Firm* — Dierker & Associates, P.C.

(57) ABSTRACT

In an example of a method for making a hollow carbon material, a carbon black particle is obtained. The carbon black particle has a concentric crystallite structure with an at least partially amorphous carbon core and a graphitic carbon shell surrounding the at least partially amorphous carbon core. The carbon black particle is exposed to any of a heat treatment, a chemical treatment, or an electrochemical treatment which removes the at least partially amorphous carbon core to form the hollow carbon material.

19 Claims, 6 Drawing Sheets

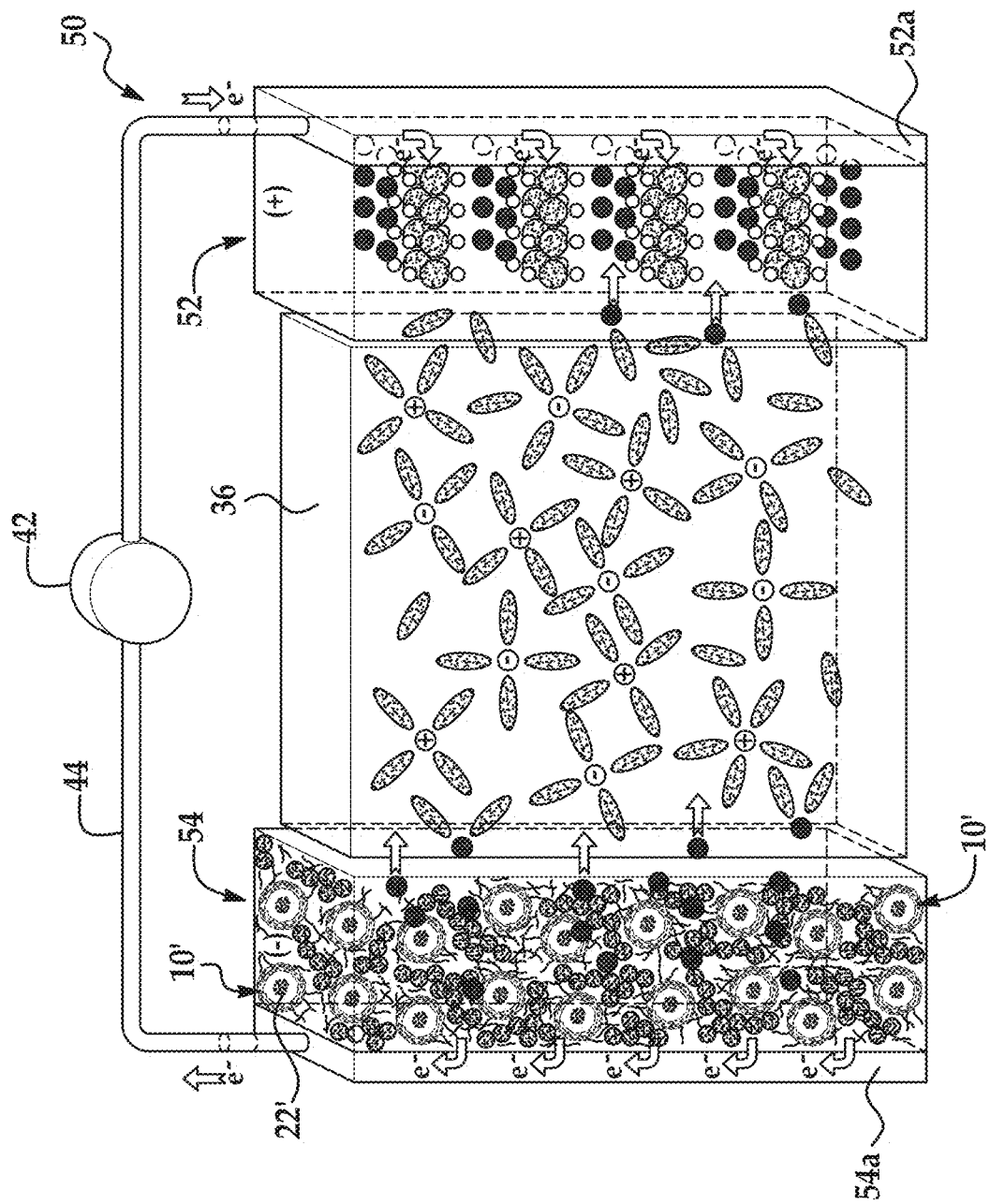

METHODS FOR MAKING HOLLOW CARBON MATERIALS AND ACTIVE MATERIALS FOR ELECTRODES

BACKGROUND

Secondary, or rechargeable, lithium-sulfur batteries or lithium ion batteries are often used in many stationary and portable devices, such as those encountered in the consumer electronic, automobile, and aerospace industries. The lithium class of batteries has gained popularity for various reasons including a relatively high energy density, a general lack of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a method for making a hollow carbon material, a carbon black particle is obtained. The carbon black particle has a concentric crystallite structure with an at least partially amorphous carbon core and a graphitic carbon shell surrounding the at least partially amorphous carbon core. The carbon black particle is exposed to any of a heat treatment, a chemical treatment, or an electrochemical treatment which removes the at least partially amorphous carbon core to form the hollow carbon material.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a perspective schematic view of an example of a lithium ion battery;

DETAILED DESCRIPTION

Figure 1:
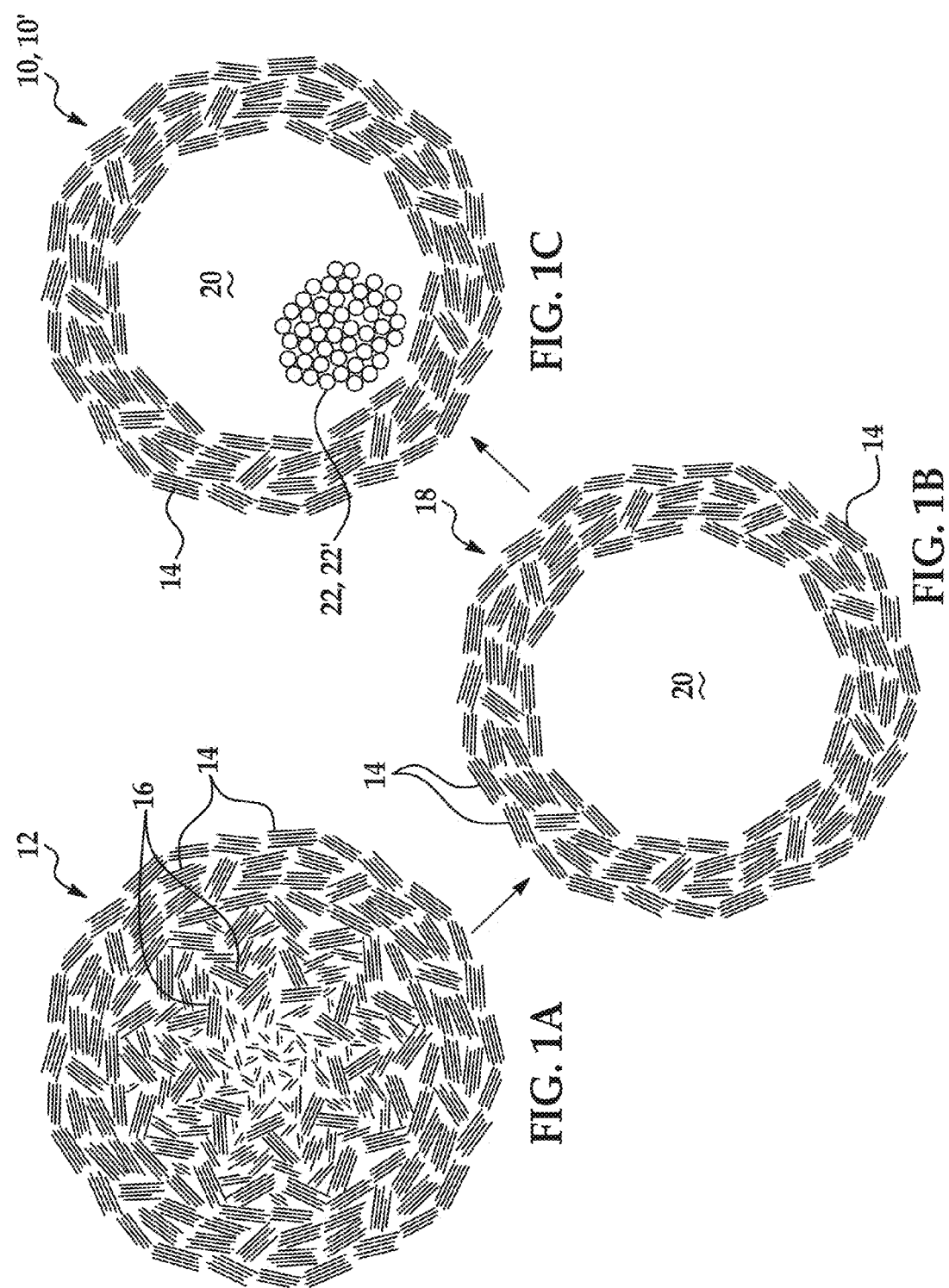
FIGS. 1A through 1C are schematic, cross-sectional views which together illustrate an example of a method for making an example of an active material for an electrode.

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes. Two examples of lithium-based batteries include the lithium-sulfur battery and the lithium ion battery.

It has been found that the lithium-sulfur battery life cycle may be limited by the relatively poor conductivity of sulfur, and by the migration, diffusion, or shuttling of polysulfides from a sulfur-based cathode during the battery discharge process, through the porous polymer separator, to a lithium-based anode. The $S_x$ polysulfides generated at the sulfur-based cathode are soluble in the electrolyte, and can migrate to the lithium-based anode where they react with the anode in a parasitic fashion to generate lower-order polysulfides. These polysulfides diffuse back to the cathode and regenerate the higher forms of polysulfide. As a result, a shuttle effect takes place. This effect leads to decreased sulfur utilization, self-discharge, poor cycleability, and reduced Coulombic efficiency of the battery. It is believed that even a small amount of polysulfide at the anode can lead to parasitic loss of active lithium at the anode, which prevents reversible electrode operation and reduces the useful life of the lithium-sulfur battery.

It has also been found that sulfur-based cathodes undergo large electromechanical (volume) expansion and contraction during charging/discharging of the lithium-sulfur battery. The large volume change (e.g., about 180%) experienced by the sulfur-based cathodes during charging/discharging causes the sulfur particles to fracture, decrepitate, or otherwise mechanically degrade, which results in a loss of electrical contact and poor life cycling.

For the lithium-sulfur or the lithium ion battery, tin (Sn) and tin oxide ($SnO_2$) may be suitable candidates as negative electrode materials. Tin may be a desirable negative electrode material due, in part, to the high theoretical capacity of pure tin (e.g., 994 mAh/g), which is three times that of graphite anodes (372 mAh/g), based on the end lithiated phase $Li_{4.4}Sn$. Tin oxide may be a desirable negative electrode material because its theoretical capacity can range from about 600 mAh/g to about 2300 mAh/g, depending upon the morphology and composition of the tin oxide. Furthermore, the potential of the tin-based negative electrodes is slightly higher than that of graphite negative electrodes. This may be advantageous because the higher potential can reduce problems associated with metallic lithium deposition on the host negative electrode, which occurs during rapid charging and discharging. However, it has been found that tin and tin oxide may also have large volume expansion and contraction during charging/discharging of the battery. The large volume change (e.g., about 360%) experienced by the tin or tin oxide negative electrode material during charging/discharging causes the negative electrode material to fracture, decrepitate, or otherwise mechanically degrade, which results in a loss of electrical contact and poor life cycling. Poor cycling performance often includes a large capacity fade, which may result from the breakdown of contact between the negative electrode material and conductive fillers in the negative electrode due to the large volume change.

In the examples disclosed herein, hollow carbon materials are formed which may act as a host material, for sulfur, tin, tin oxide, or any other suitable active electrode materials. The hollow carbon materials disclosed herein include a hollow core that can house the active electrode material and also maintain a void that accommodates the volumetric expansion and contraction of the active electrode material during charging/discharging cycles. The hollow carbon materials disclosed herein also include a graphitic shell that can act as an excellent electronic conductor in order to conduct electrons during a battery operation. When the hollow carbon material is a host for sulfur, the active material may be used in a positive electrode for a lithium-sulfur battery. When the hollow carbon material is a host for tin or tin oxide, the active material may be used in a negative electrode for a lithium-sulfur battery or a lithium ion battery.

Referring now to FIGS. 1A and 1B, an example of a method for making the hollow carbon material 18 (shown in FIG. 1B) is depicted. At the outset of the method, as shown in FIG. 1A, a heterogeneous carbon material 12 is selected. The heterogeneous carbon material 12 is any carbon particle that possesses a concentric crystallite structure type. In the concentric crystallite structure type, the carbon particle has a core (i.e., center portion) 16 that is more disordered and is made up of small and imperfect crystallites, single-layer planes, and at least partially amorphous carbon, and an outer shell 14 that is more ordered (i.e., graphitic) and is made up of larger, more perfect crystallites whose layer planes are generally oriented parallel to particle surfaces. The at least partially amorphous carbon core 16 may be made up of some amorphous carbon and some other type of carbon, or may completely be made up of amorphous carbon. As such, the at least partially amorphous carbon core 16 may be referred to herein as a partially or fully amorphous carbon core 16. In an example, the heterogeneous carbon material 12 is a concentric crystallite structure type having a fully amorphous carbon core 16 and a graphitic carbon outer shell 14. It is to be understood that any carbon black having the concentric crystallite structure type described herein may be used as the heterogeneous carbon material 12. Some examples of suitable commercially available carbon black particles include VULCAN® XC72 (Cabot Corp.), KETJENBLACK® (Akzo Nobel), and Black Pearl (BP2000) (Cabot Corp.).

The heterogeneous carbon material 12 may include a network of pores/channels. Within the network of pores/channels, any one pore/channel may be interconnected with other pore(s)/channel(s) and/or may extend from an outer surface through at least a portion of the heterogeneous carbon material 12. In an example, the heterogeneous carbon material 12 is a mesoporous material with each of the pores/channels having a diameter ranging from about 1 nm to about 7 nm. A size (e.g., diameter or average diameter) of the heterogeneous carbon material 12 may be 100 nm or less.

To form the hollow carbon material 18, the heterogeneous carbon material 12 is exposed to a thermal (i.e., heat), chemical or electrochemical treatment. The thermal, chemical, or electrochemical treatment disclosed herein results in the removal of the more disordered core 16, which has a higher corrosion rate than the more ordered or graphitic carbon outer shell 14. As a result of exposing the heterogeneous carbon material 12 to any one of these treatments, the partially or fully amorphous carbon core 16 is removed and the hollow carbon material 18 is generated. The hollow carbon material 18 includes the more ordered or graphitic carbon shell 14 and a hollow center/core 20 at the region previously occupied by the less ordered material.

The thermal/heat treatment includes exposing the heterogeneous carbon material 12 to i) air or ii) a controlled environment including from about 5% to about 50% of oxygen gas ($O_2$) and from about 50% to about 95% of an inert gas (e.g., Ar or $N_2$), at a temperature ranging from about 200° C. to about 550° C. and for a time ranging from about 1 hour to about 10 hours. In an example, carbon black particles having the concentric crystallite structure type are exposed to air at a temperature of about 500° C. for about 5 hours. This process results in the removal of the partially or fully amorphous carbon core 16. More particularly, this process results in the partially or fully amorphous carbon core 16 corroding away. The $O_2$ gas diffuses into the partially or fully amorphous carbon core 16 through the pores/channels in the graphitic carbon outer shell 14, and the corrosion product, $CO_2$ gas, emits out through the pores/channels. It is to be understood that the graphitic carbon outer shell 14 may also experience corrosion; however, the corrosion rate of the graphitic carbon outer shell 14 is far lower than that of the partially or fully amorphous carbon core 16. As a result, the center-hollowed carbon material 18 is generated.

The chemical treatment involves reacting the heterogeneous carbon material 12 with an inorganic acid. Examples of suitable inorganic acids include $HNO_3$ and $H_2SO_4$. The concentration of the inorganic acid ranges from about 40% to about 75%.

The heterogeneous carbon material 12 may be added to the inorganic acid, or the inorganic acid may be added to the heterogeneous carbon material 12. Any suitable amount of the heterogeneous carbon material 12 and the inorganic acid may be added so long as the heterogeneous carbon material 12 is completely immersed in the inorganic acid solution. The reactants may be constantly stirred (e.g., with a magnetic stir bar) during the reaction, and the reaction time may be at least 20 hours. The reaction between the acid and the heterogeneous carbon material 12 removes the partially or fully amorphous carbon core 16.

In some examples, the reaction between the heterogeneous carbon material 12 and the inorganic acid may be accelerated by exposing the reaction mixture to a temperature ranging from about 25° C. to about 70° C. This additional heating step may be used throughout the chemical treatment or for a portion of the time that the reaction is taking place.

While example inorganic acid concentrations and temperatures for accelerating the chemical reaction have been given herein, it is to be understood that higher concentrations (e.g., from greater than 75% to about 98%) and/or higher acceleration temperatures (e.g., above 70° C.) may be used. These higher concentrations and/or higher acceleration temperatures will remove the partially or fully amorphous carbon core 16 at a more rapid pace, and thus will speed up the reaction time and the formation of the hollow carbon material 18. However, these higher concentrations and/or higher acceleration temperatures may also deleteriously affect the graphitic carbon outer shell 14. As such, when higher concentrations and/or higher acceleration temperatures are used, the chemical reaction should be well controlled so as to not dissolve or otherwise corrode the graphitic carbon outer shell 14.

When the chemical reaction is complete, the reaction mixture may be neutralized to pH 7 using a base, such as 0.1 M to 1 M NaOH, and then repetitively washed and centrifuged. In an example, washing and centrifugation is accomplished at least 3 times. Finally, the product is dried in vacuum at a temperature ranging from about 60° C. to about 80° C. for about 24 hours.

The electrochemical treatment involves electrochemically reacting the heterogeneous carbon material 12 with an $HClO_4$ solution having a molar concentration ranging from about 0.05 M to 1 M. The electrochemical reaction between the heterogeneous carbon material 12 and the $HClO_4$ solution may take place at a temperature ranging from about 25° C. to about 550° C. and for a time ranging from about 2 hours to about 10 hours. This process results in the removal of the partially or fully amorphous carbon core 16.

When the electrochemical reaction is complete, the reaction mixture may be neutralized to pH 7 using a base, such as 0.1 M to 1 M NaOH, and then repetitively washed and centrifuged. In an example, washing and centrifugation are accomplished at least 3 times. Finally, the product is dried in vacuum at a temperature ranging from about 60° C. to about 80° C. for about 24 hours.

Whether the thermal, chemical, or electrochemical process is used, the resulting product is the hollow carbon material 18 including the more ordered or graphitic carbon shell 14 and a hollow center/core 20.

As shown in FIG. 1C, sulfur 22 or tin/tin oxide 22' may then be introduced into the hollow core 20 of the hollow carbon material 18. Sulfur 22 may be used when forming an active material 10 for a positive electrode of a lithium-sulfur battery, and tin or tin oxide 22' may be used when forming an active material 10' for a negative electrode of a lithium-sulfur or a lithium ion battery.

Sulfur 22 may be incorporated into the hollow core 20 of the hollow carbon material 18 using an impregnation process. An example of the impregnation process involves mixing the hollow carbon material 18 with elemental sulfur 22 at a weight ratio ranging from 1:3 to 1:4 to form a mixture. The mixture is then encapsulated in a tube, after vacuuming the tube at a pressure below 200 mtorr. The encapsulated mixture is then exposed to an elevated temperature for a predetermined time in order to infuse the elemental sulfur 22 into the hollow core 20 of the hollow carbon material 18. When the sulfur impregnation process is accomplished via melt infusing, the elevated temperature ranges from about 115° C. to about 165° C. and the predetermined time ranges from about 10 hours to about 20 hours. When the sulfur impregnation process is accomplished via vapor infusing, the elevated temperature ranges from about 444° C. to about 500° C. and the predetermined time ranges from about 10 hours to about 20 hours.

The active material 10 may be referred to as a yolk-shell structure, at least in part because at least some of the sulfur 22 is like a yolk within the porous graphitic carbon shell 14. More particularly, the sulfur 22 may not fill the entire volume of the hollow core 20. As such, it is believed that a void (e.g., unoccupied space) remains at/near the center of the active material 10. In an example, a maximum amount of the sulfur 22 that is present in the hollow core 20 after impregnation is believed to occupy less than 90% of the hollow core volume. This is due to results from a thermal gravimetric analysis (TGA) of an example of the active material 10, which indicates that the weight percentage of sulfur in the active material 10 ranges from about 75 wt % to about 85 wt % of the total active material weight percent. The portion of the hollow core 20 that remains as the void provides space to accommodate the volumetric expansion and contraction of the sulfur 22 during lithiation. In addition to being present within the hollow core 20, the sulfur 22 may also be present on the various surfaces of the graphitic carbon shell 14 due to the low contact angle (about 4.3°) or good wettability between graphite and sulfur.

Tin or tin oxide 22' may be incorporated into the hollow core 20 of the hollow carbon material 18 using a wet chemistry technique. In an example of the wet chemistry technique, any suitable tin precursor may be used, such as $SnSO_4$, $Sn(NO_3)_2$, and $Sn(Cl)_2$. A solution containing 1 M of one of these precursors is introduced into the hollow core 20 of the hollow carbon material 18 by an incipient wetness impregnation (i.e., the volume of the solution added is approximately the same void volume of the hollow carbon material 18). After the incipient wetness impregnation, the impregnated carbon material is dried at a temperature ranging from about 60° C. to about 80° C. in vacuum for about 24 hours. The dried, impregnated carbon material is then annealed at about 900° C. in from about 2 vol. % to about 10 vol. % $H_2$/Ar for a time ranging from about 2 hours to about 5 hours to reduce the tin precursor. After annealing, the material is cooled in a furnace under continued $H_2$/Ar flow. Finally the product is slowly exposed to air by gradually reducing the $H_2$/Ar flow rate to avoid rapid oxidation of the tin. In this manner, the active material 10', which in this example is a pure Sn-hollow carbon composite, is obtained.

In an example when it is desirable to impregnate tin oxide into the hollow core 20, the procedure described herein for obtaining the pure Sn-hollow carbon composite may be performed, and then the pure Sn-hollow carbon composite may be exposed to annealing in air or in a controlled oxidizing environment (e.g., from about 2% to about 15% $O_2$/Ar) at a temperature ranging from about 100° C. to about 200° C. for a time ranging from about 2 hours to about 5 hours.

Figure 2:
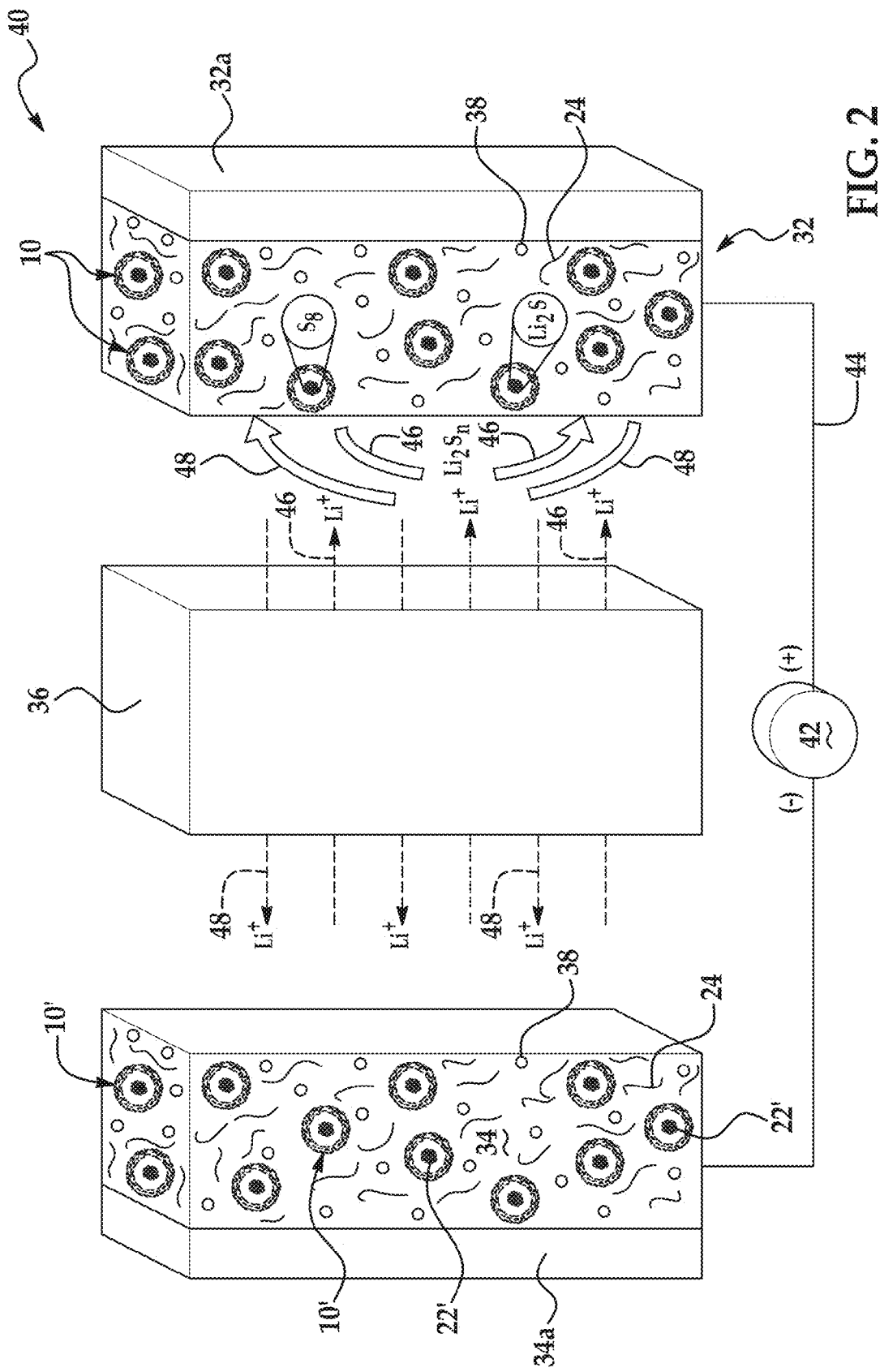
FIG. 2 is a perspective schematic view of a lithium-sulfur battery showing a charging and discharging state, the battery including an example of a positive electrode according to an example of the present disclosure.

As mentioned above, the active materials 10, 10' may be used to form certain electrode materials. For example, the active material 10 including impregnated sulfur 22 may be used as the sulfur based active material in a positive electrode of a lithium-sulfur battery. An example of the lithium-sulfur battery 40 including this positive electrode 32 is shown in FIG. 2, which will now be discussed in detail. The lithium-sulfur battery 40 generally includes the positive electrode 32, a negative electrode 34, and a porous polymer separator 36 positioned between the positive and negative electrodes 32, 34.

The positive electrode 32 may include up to 90% by weight (i.e., 90 wt %) of the sulfur-containing active material 10. In addition to including the sulfur-containing active material 10, the positive electrode 32 also includes a conductive carbon material 38 and a binder 24. An example of the conductive carbon material 38 is a high surface area carbon, such as acetylene black. The binder 24 may be any polymer binder material that can structurally hold the sulfur-containing active material 10 and the conductive carbon material 38 together. As examples, the polymer binder material may be made of at least one of polyvinylidene fluoride (PVdF), polyethylene oxide (PEO), an ethylene propylene diene monomer (EPDM) rubber, sodium alginate, carboxymethyl cellulose (CMC)), styrene-butadiene rubber (SBR), polyacrylic acid (PAA), polyvinyl alcohol (PVA), or other water soluble binders.

The loading of the respective positive electrode components may include: from about 75 wt % to about 90 wt % (based on the total wt % of the positive electrode 32) of the sulfur-containing active material 10, from about 5 wt % to about 15 wt % of the conductive carbon material 38, and from about 5 wt % to about 10 wt % of the binder 24. In an example, the positive electrode 32 includes about 90 wt % of the sulfur-containing active material 10, about 5 wt % of the conductive carbon material 38, and about 5 wt % of the binder 24.

The negative electrode 34 of the lithium-sulfur battery 40 may include any lithium host material that can sufficiently undergo lithiation and delithiation with copper functioning as the negative terminal/current collector 34a of the lithium-sulfur battery 40. In one example (as shown in FIG. 2), the negative electrode 34 includes the active material 10' having tin or tin oxide 22' incorporated therein, a conductive carbon material 38', and a binder 24'. Any of the conductive carbon materials 38 and binders 24 previously described may be used in the negative electrode 34. The polymer binder material 24' structurally holds the active material 10' together, and the conductive carbon material 38' ensures electron conduction between the active material of the negative electrode 34 and, for example, the current collector 34a.

In another example (not shown), the negative electrode 34 includes an active material other than the active material 10'. Examples of other suitable active materials for the negative electrode 34 include graphite, lithium titanate, lithiated silicon (e.g., $LiSi_x$), or lithiated tin. Graphite may be desirable in this example of the negative electrode 34 because it exhibits reversible lithium intercalation and deintercalation characteristics, is relatively non-reactive, and can store lithium in quantities that produce a relatively high energy density. Commercial forms of graphite that may be used to fabricate the negative electrode 34 are available from, for example, Timcal Graphite & Carbon (Bodio, Switzerland), Lonza Group (Basel, Switzerland), or Superior Graphite (Chicago, Ill.).

As shown in FIG. 2, the lithium-sulfur battery 40 may also include the positive-side current collector 32a and the negative-side current collector 34a positioned in contact with the positive electrode 32 and the negative electrode 34, respectively, to collect and move free electrons to and from an external circuit 44. The positive-side current collector 32a may be formed from aluminum or any other appropriate electrically conductive material known to skilled artisans. The negative-side current collector 34a may be formed from copper or any other appropriate electrically conductive material known to skilled artisans.

The lithium-sulfur battery 40 also includes the porous polymer separator 36, which operates as both an electrical insulator and a mechanical support. The porous polymer separator 36 is sandwiched between the positive electrode 32 and the negative electrode 34 to prevent physical contact between the two electrodes 32, 34 and the occurrence of a short circuit. The porous polymer separator 36, in addition to providing a physical barrier between the two electrodes 32, 34, ensures passage of lithium ions (identified by the $Li^+$) and some related anions through an electrolyte solution filling its pores (not shown).

The porous polymer separator 36 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous polymer membranes include single layer polypropylene membranes, such as CELGARD 2400 and CELGARD 2500 from Celgard, LLC (Charlotte, N.C.). It is to be understood that the porous polymer separator 36 may be coated or treated, or uncoated or untreated. For example, the porous polymer separator 36 may or may not include any surfactant treatment thereon.

In other examples, the porous polymer separator 36 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the separator 36 is poly(p-hydroxybenzoic acid). In yet another example, the porous polymer separator 36 may be chosen from a combination of the polyolefin (such as PE and/or PP) and one or more of the polymers listed above.

The porous polymer separator 36 may be a single layer or may be a multi-layer (e.g., bilayer, trilayer, etc.) laminate fabricated from either a dry or wet process. In some instances, the porous polymer separator 36 may include fibrous layer(s) to impart appropriate structural and porosity characteristics.

Each of the positive electrode 32, the negative electrode 34, and the porous polymer separator 36 are soaked in an electrolyte solution (not shown). Any appropriate electrolyte solution that can conduct lithium ions between the negative electrode 34 and the positive electrode 32 may be used in the lithium-sulfur battery 40. In one example, the non-aqueous electrolyte solution may be an ether based electrolyte that is stabilized with lithium nitrite. Other non-aqueous liquid electrolyte solutions may include a lithium salt dissolved in an organic solvent or a mixture of organic solvents. Examples of lithium salts that may be dissolved in the ether to form the non-aqueous liquid electrolyte solution include $LiClO_4$, $LiAlCl_4$, $LiI$, $LiBr$, $LiSCN$, $LiBF_4$, $LiB(C_6H_5)_4 LiAsF_6$, $LiCF_3SO_3$, $LiN(FSO_2)_2$, $LiN(CF_3SO_2)_2$, $LiAsF_6$, $LiPF_6$, and mixtures thereof. The ether based solvents may be composed of cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof.

The lithium-sulfur battery 40 also includes an interruptible external circuit 44 that connects the positive electrode 32 and the negative electrode 34. The lithium-sulfur battery 40 may also support a load device 42 that can be operatively connected to the external circuit 44. The load device 42 may be powered fully or partially by the electric current passing through the external circuit 44 when the lithium-sulfur battery 40 is discharging. While the load device 42 may be any number of known electrically-powered devices, a few specific examples of a power-consuming load device include an electric motor for a hybrid vehicle or an all-electrical vehicle, a laptop computer, a cellular phone, and a cordless power tool. The load device 42 may also, however, be a power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the positive electrode 32 and the negative electrode 34 for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 42 so requires.

The lithium-sulfur battery 40 can generate a useful electric current during battery discharge (shown by reference numeral 46 in FIG. 2). During discharge, the chemical processes in the battery 40 include lithium (Li$^+$) dissolution from the negative electrode 34 and incorporation of the lithium cations into sulfur or high form polysulfide anions (i.e., $S_x^{2-}$) within the respective cores 20 of the sulfur-containing active materials 10. As such, polysulfides are formed (sulfur is reduced) within the active materials 10 in the positive electrode 32 in sequence while the battery 40 is discharging. The chemical potential difference between the positive electrode 32 and the negative electrode 34 (ranging from approximately 1.5 to 3.0 volts, depending on the exact chemical make-up of the electrodes 32, 34) drives electrons produced by the dissolution of lithium at the negative electrode 34 through the external circuit 44 towards the positive electrode 32. The resulting electric current passing through the external circuit 44 can be harnessed and directed through the load device 42 until the lithium in the negative electrode 34 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 48 in FIG. 2), lithium plating to the negative electrode 34 takes place and sulfur formation within the respective cores 20 of the sulfur-containing active materials 10 at the positive electrode 32 takes place. The connection of an external power source to the lithium-sulfur battery 40 compels the otherwise non-spontaneous oxidation of lithium at the positive electrode 32 to produce electrons and lithium ions. The electrons, which flow back towards the negative electrode 34 through the external circuit 44, and the lithium ions (Li$^+$), which are carried by the electrolyte across the porous polymer separator 36 back towards the negative electrode 34, reunite at the negative electrode 34 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

As mentioned above, the active material 10' may be used to form a negative electrode, in part because the active material 10' including tin or tin oxide 22' can sufficiently undergo lithium insertion and deinsertion. As such, the active material 10' may be used in a negative electrode of a lithium ion battery. The negative electrode may also include the polymer binder material (e.g., binder 24) and a conductive filler material (e.g., material 38, such as acetylene black or another conductive filler material). An example of the lithium ion battery 50 including this type of negative electrode is shown in FIG. 3.

As depicted in FIG. 3, the lithium ion battery 50 includes the negative electrode 54, the negative side current collector 54a, a positive electrode 52, a positive-side current collector 52a, and a porous separator 36 positioned between the negative electrode 54 and the positive electrode 52.

The positive electrode 52 may include any lithium transition metal oxide-based active material, a polymer binder material (e.g., binder 24), and a conductive filler material (e.g., conductive carbon material 38). Examples of the lithium transition metal oxide-based active material include spinel lithium manganese oxide (LiMn$_2$O$_4$), a nickel-manganese oxide spinel [Li(Ni$_{0.5}$Mn$_{1.5}$)O$_2$], a layered nickel-manganese-cobalt oxide [Li(Ni$_x$Mn$_y$Co$_z$)O$_4$], LiCoO$_2$, LiNiO$_2$, LiFePO$_4$, Li$_2$MSiO$_4$ (M=Co, Fe, Mn), a lithium rich layer-structure cathode, such as xLi$_2$MnO$_3$-(1-x)LiMO$_2$ (M is composed of any ratio of Ni, Mn and Co), or HE-NMC (high efficiency Nickel-Manganese-Cobalt) cathodes.

The positive-side current collector 52a may be formed from aluminum or any other appropriate electrically conductive material known to skilled artisans.

The porous polymer separator 36 positioned between the positive electrode 52 and the negative electrode 54 may be any of the examples previously described in reference to FIG. 2.

In the lithium ion battery 50, the negative electrode 54, the positive electrode 52, and the separator 36 are soaked with an electrolyte solution. This electrolyte solution may be a non-aqueous liquid electrolyte solution that includes a lithium salt dissolved in an organic solvent or a mixture of organic solvents. Examples of lithium salts that may be dissolved in an organic solvent to form the non-aqueous liquid electrolyte solution include LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$, LiN(CF$_3$SO$_2$)$_2$, LiAsF$_6$, LiPF$_6$, and mixtures thereof. These and other similar lithium salts may be dissolved in a variety of organic solvents, such as cyclic carbonates (ethylene carbonate, propylene carbonate, butylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIG. 3, the lithium ion battery 50 also includes the interruptible external circuit 44 that connects the negative electrode 54 and the positive electrode 52. The lithium ion battery 30 may also support the load device 42 that can be operatively connected to the external circuit 44. In this example, the load device 42 receives a feed of electrical energy from the electric current passing through the external circuit 44 when the lithium ion battery 50 is discharging. Any examples of the load device 42 previously described may be used.

The lithium ion battery 50 may also include a wide range of other components that, while not depicted here, are nonetheless known to skilled artisans. For instance, the lithium ion battery 50 may include a casing, gaskets, terminals, tabs, and any other desirable components or materials that may be situated between or around the negative electrode 54 and the positive electrode 52 for performance-related or other practical purposes. Moreover, the size and shape of the lithium ion battery 50, as well as the design and chemical make-up of its main components, may vary depending on the particular application for which it is designed. The lithium ion battery 50 may also be connected in series and/or in parallel with other similar lithium ion batteries to produce a greater voltage output and current (if arranged in parallel) or voltage (if arranged in series) if the load device 42 so requires.

The lithium ion battery 50 generally operates by reversibly passing lithium ions between the negative electrode 54 and the positive electrode 52. In the fully charged state, the voltage of the battery 50 is at a maximum (typically in the range 3.0 to 5.0V); while in the fully discharged state, the voltage of the battery 50 is at a minimum (typically in the range 1.0 to 3.0V). Essentially, the Fermi energy levels of the active materials in the positive and negative electrodes 52, 54 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 42 enables an electronic current flow in the external circuit 44 with a direction such that the difference between the Fermi levels (and, correspondingly, the cell voltage) decreases. The reverse happens during battery charging: the battery charger forces an electronic current flow in the external circuit 44 with a direction such that the difference between the Fermi levels (and, correspondingly, the cell voltage) increases.

At the beginning of a discharge, the negative electrode 54 of the lithium ion battery 50 contains a high concentration of intercalated lithium while the positive electrode 52 is relatively depleted. When the negative electrode 54 contains a sufficiently higher relative quantity of intercalated lithium, the lithium ion battery 50 can generate a beneficial electric current by way of reversible electrochemical reactions that occur when the external circuit 44 is closed to connect the negative electrode 54 and the positive electrode 52. The establishment of the closed external circuit under such circumstances causes the extraction of intercalated lithium from the negative electrode 54. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 52 and the negative electrode 54 (ranging from about 3.0 volts to about 5.0 volts, depending on the exact chemical make-up of the electrodes 52, 54) drives the electrons ($e^-$) produced by the oxidation of intercalated lithium at the negative electrode 54 through the external circuit 44 towards the positive electrode 52. The lithium ions are concurrently carried by the electrolyte solution through the porous polymer separator 36 towards the positive electrode 52. The electrons ($e^-$) flowing through the external circuit 44 and the lithium ions migrating across the porous polymer separator 36 in the electrolyte solution eventually reconcile and form intercalated lithium at the positive electrode 52. The electric current passing through the external circuit 32 can be harnessed and directed through the load device 42 until the level of intercalated lithium in the negative electrode 54 falls below a workable level or the need for electrical energy ceases.

The lithium ion battery 50 may be recharged after a partial or full discharge of its available capacity. To charge the lithium ion battery 50, an external battery charger is connected to the positive and the negative electrodes 52, 54, to drive the reverse of battery discharge electrochemical reactions. During recharging, the electrons ($e^-$) flow back toward the negative electrode 54 through the external circuit 44, and the lithium ions are carried by the electrolyte across the porous polymer separator 36 back toward the negative electrode 54. The electrons ($e^-$) and the lithium ions are reunited at the negative electrode 54, thus replenishing it with intercalated lithium for consumption during the next battery discharge cycle.

The external battery charger that may be used to charge the lithium ion battery 50 may vary depending on the size, construction, and particular end-use of the lithium ion battery 50. Some suitable external battery chargers include a battery charger plugged into an AC wall outlet and a motor vehicle alternator.

To further illustrate the present disclosure, an example is given herein. It is to be understood that this example is provided for illustrative purposes and is not to be construed as limiting the scope of the disclosed example(s).

EXAMPLE

Figure 4A:
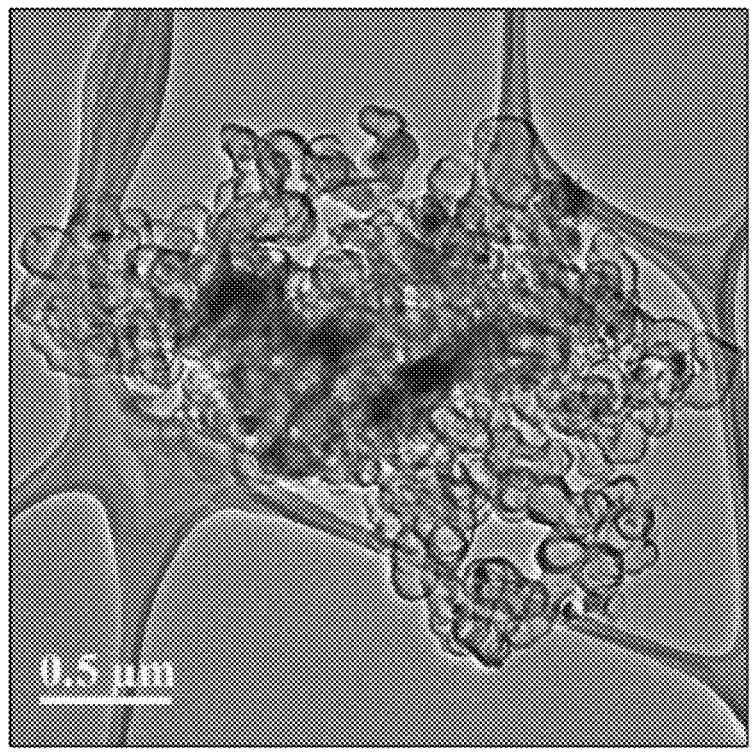
FIG. 4A is a Scanning Transition Electron Micrograph (STEM) of an example of the hollow carbon material disclosed herein.

A hollow carbon material according to the examples disclosed herein was prepared. To make the hollow carbon material, carbon black particles having an amorphous core and a graphitic shell were exposed to thermal oxidation. The carbon black particles used were VULCAN® XC72 (Cabot Corp.). The carbon black particles were heated at 500° C. in air for about 5 hours. This thermal oxidation process formed hollow carbon black particles having porous, graphitic carbon shells. A Scanning Transmission Electron Microscopy (STEM) image was taken of the hollow carbon black particles. The STEM is shown in FIG. 4A.

Sulfur was impregnated into the hollow carbon black particles by mixing the hollow carbon black particles with elemental sulfur at a weight ratio of 1:4. The mixture was encapsulated in a quartz tube after vacuuming the tube below 200 mtorr. The encapsulated mixture was exposed to 160° C. for 15 hours. This impregnated sulfur into the hollow carbon black particles, and thus formed the sulfur-containing active material.

Figure 4B:
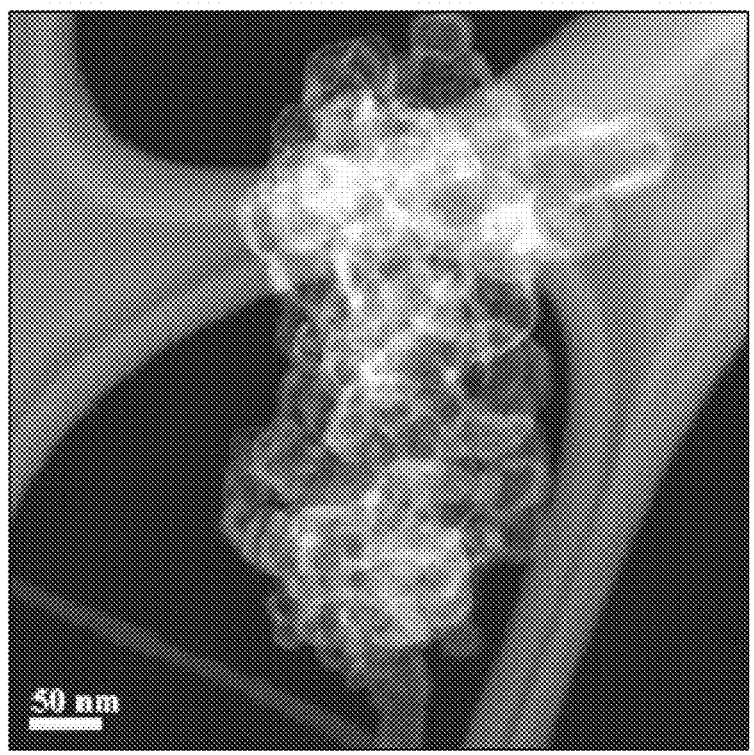
FIG. 4B is a STEM of an example of the sulfur-containing active material disclosed herein.
Figure 4C:
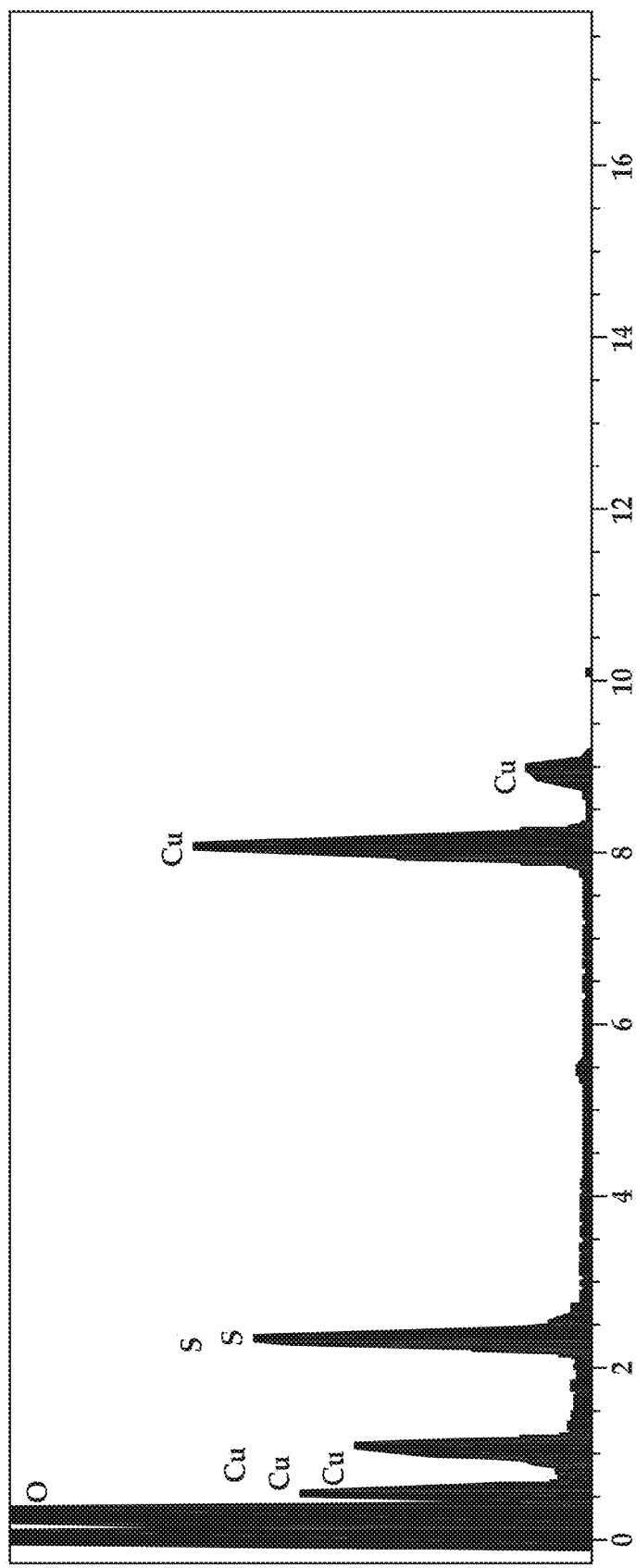
FIG. 4C is an Energy-dispersive X-ray spectroscopy (EDS) spectrum of the example of the sulfur-containing material shown in FIG. 4B.

Based on the small contact angle (4.3°) between sulfur and graphite, the sulfur should have been present both in the hollow core of the hollow carbon black particles and on the exterior surface of the hollow carbon black particles (i.e., on the outer surface of the hollow particle shell). This was confirmed using the STEM image and the Energy-dispersive X-ray spectroscopy (EDS) spectrum of the sulfur-containing active material. The STEM and EDS are shown in FIGS. 4B and 4C, respectively. STEM and EDS indicate the presence of sulfur and its uniform distribution inside the hollow carbon particle and outside exterior surfaces. It is noted that in FIG. 4C, the presence of copper is from the transmission electron microscopy sample grid, which was made from copper.

The sulfur-containing active material was used to form an example positive electrode. The example positive electrode included 90 wt % of the sulfur-containing active material, 5 wt % of Super-P carbon (Timcal), and 5 wt % of sodium alginate (MP Biomedicals).

For a comparative active material, carbon black particles were mixed with sulfur at a weight ratio of carbon:sulfur of 1:4. VULCAN® XC72 carbon black particles were used in the comparative active material, except that the amorphous core was not removed. This comparative active material was used to form a comparative positive electrode. The comparative positive electrode included 90 wt % of the comparative active material, 5 wt % of Super-P carbon (Timcal), and 5 wt % of sodium alginate (MP Biomedicals).

The example positive electrode and the comparative example positive electrode were used, respectively, with a lithium metal negative electrode to construct half cells. Coin cells (2032 hardware) were assembled inside an Ar-filled glovebox. Microporous tri-layered polypropylene (PP) and polyethylene (PE) polymer membranes (Celgard 2500, Celgard) was used as the separator. The electrolyte consisted of 1 M (bis)trifluoro-methane-sulfonate imide (Li(CF$_3$SO$_2$)$_2$N, LiTFSI) in a mixed solution of 1,2-dimethoxyethane (DME) and 1,3-dioxolane (DIOX) (1:1 volume ratio). 2 wt % LiNO$_3$ was added into the electrolyte as an additive to help passivate the surface of the lithium anode and reduce the shuttle effect of polysulfide ions.

The coin cells were held at 30° C. to perform electrochemical cycling tests. The cycling tests were carried out at a constant current density of 10 mA g$^{-1}$ based on the mass of the positive electrode and cycled within the voltage window of 1.7-2.8 V for 50 cycles.

Figure 5:
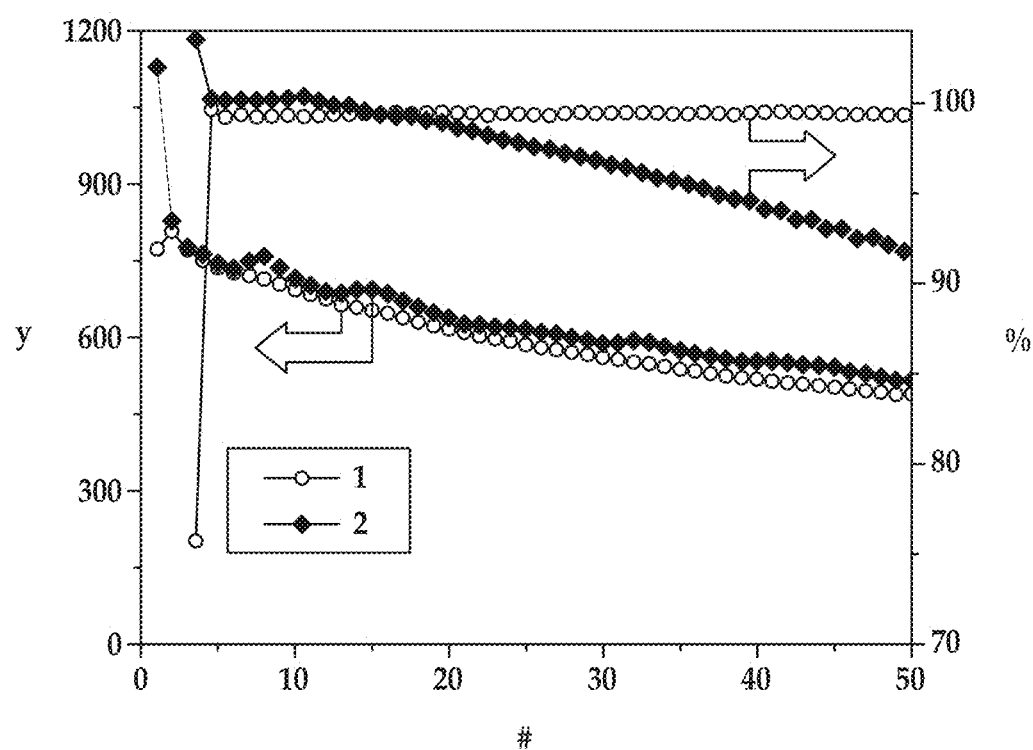
FIG. 5 is a graph illustrating the discharge capacity (mAh/g, left Y-axis) vs. cycle number and the Coulombic efficiency (%, right Y-axis) vs. cycle number for a lithium-sulfur cell with an example of a positive electrode including an example of the sulfur-containing active material disclosed herein, and a comparative lithium-sulfur cell with a comparative active material.

FIG. 5 depicts the discharge capacity (mAh/g) (left Y axis labeled "Y") and the Coulombic efficiency (%) (right Y axis labeled "%") versus the cycle number (X axis labeled "#"). The example positive electrode is labeled "1" and the comparative positive electrode is labeled "2".

As illustrated in FIG. 5, the example positive electrode (1) including the sulfur-containing active material exhibited a similar discharge capacity as the comparative positive electrode (2) from the 2$^{nd}$ cycle to the 50$^{th}$ cycle. The Coulombic efficiency of the example positive electrode (1) was higher than that of comparative positive electrode (2), especially after 25 cycles. After 50 cycles, the Coulombic efficiency of the example positive electrode (1) was about 99%, while the Coulombic efficiency of the comparative positive electrode (2) was about 92. It is believed that the improved efficiency in the example cell with the example positive electrode (1) may be attributed to the impregnation of the sulfur within the hollow carbon material.

It is to be understood that the ranges provided herein include the stated range and any value or sub-range within the stated range. For example, a range of about 200° C. to about 550° C. should be interpreted to include not only the explicitly recited limits of about 200° C. to about 550° C., but also to include individual values, such as 225° C., 375° C., 430.5° C., etc., and sub-ranges, such as from about 250° C. to about 450° C.; from about 300° C. to about 500° C., etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for making a hollow carbon material, the method comprising:
    obtaining a carbon black particle having a concentric crystallite structure with an at least partially amorphous carbon core and a graphitic carbon shell surrounding the at least partially amorphous carbon core; and
    exposing the carbon black particle to a chemical treatment with an inorganic acid or an electrochemical treatment with HClO$_4$, thereby removing the at least partially amorphous carbon core to form the hollow carbon material.

2. The method as defined in claim 1 wherein the chemical treatment includes reacting the carbon black particle with the inorganic acid.

3. The method as defined in claim 2 wherein:
    the inorganic acid is selected from HNO$_3$ and H$_2$SO$_4$;
    a concentration of the inorganic acid ranges from about 40% to about 75%;
    and a reaction time is at least 20 hours.

4. The method as defined in claim 2, further comprising exposing the carbon black particle and the inorganic acid to a temperature ranging from about 25° C. to about 70° C.

5. The method as defined in claim 1 wherein the electrochemical treatment includes electrochemically reacting the carbon black particle with a 0.05 M to 1 M HClO$_4$ solution at a temperature ranging from about 25° C. to about 550° C. and for a time ranging from about 2 hours to about 10 hours.

6. A method for making an active material for an electrode, the method comprising:
    obtaining a carbon black particle having a concentric crystallite structure with an at least partially amorphous carbon core and a graphitic carbon shell surrounding the at least partially amorphous carbon core;
    exposing the carbon black particle to any of a heat treatment, a chemical treatment, or an electrochemical treatment, thereby removing the at least partially amorphous carbon core to form a hollow carbon material; and
    incorporating sulfur, tin, or tin oxide into a hollow core of the hollow carbon material, thereby forming a hollow carbon composite, wherein the sulfur is incorporated via melt infusing or vapor infusing, and wherein the tin or tin oxide is incorporated via an incipient wetness impregnation technique.

7. The method as defined in claim 6 wherein the heat treatment includes exposing the carbon black particle to i) air or ii) a controlled environment including from about 5% to about 50% of oxygen gas and from about 50% to about 95% of an inert gas, at a temperature ranging from about 200° C. to about 550° C. and for a time ranging from about 1 hour to about 10 hours.

8. The method as defined in claim 6 wherein the chemical treatment includes reacting the carbon black particle with an inorganic acid.

9. The method as defined in claim 8 wherein:
    the inorganic acid is selected from HNO$_3$ and H$_2$SO$_4$;
    a concentration of the inorganic acid ranges from about 40% to about 75%;
    and a reaction time is at least 20 hours.

10. The method ad defined in claim 8, further comprising exposing the carbon black particle and the inorganic acid to a temperature ranging from about 25° C. to about 70° C.

11. The method as defined in claim 6 wherein the electrochemical treatment includes electrochemically reacting the carbon black particle with a 0.05M to 1M HClO$_4$ solution at a temperature ranging from about 25° C. to about 550° C. and for a time ranging from about 2 hours to about 10 hours.

12. A method for making an active material for an electrode, the method comprising:
    obtaining a carbon black particle having a concentric crystallite structure with an at least partially amorphous carbon core and a graphitic carbon shell surrounding the at least partially amorphous carbon core;

exposing the carbon black particle to any of a heat treatment, a chemical treatment, or an electrochemical treatment, thereby removing the at least partially amorphous carbon core to form a hollow carbon material; and incorporating sulfur into a hollow core of the hollow carbon material, thereby forming a hollow carbon composite, wherein the incorporating of the sulfur into the hollow core of the hollow carbon material includes:

mixing the hollow carbon material with elemental sulfur at a weight ratio ranging from 1:3 to 1:4, thereby forming a mixture;

encapsulating the mixture in a tube after exposing the tube to a vacuum below 200 mtorr; and exposing the encapsulated mixture to an elevated temperature for a predetermined time, thereby infusing the elemental sulfur into the hollow core of the hollow carbon material.

13. The method as defined in claim 12 wherein:
infusing the elemental sulfur is accomplished via melt infusing;
the elevated temperature ranges from about 115° C. to about 165° C.; and
the predetermined time ranges from about 10 hours to about 20 hours.

14. The method as defined in claim 12 wherein:
infusing the elemental sulfur is accomplished via vapor infusing;
the elevated temperature ranges from about 444° C. to about 500° C.; and
the predetermined time ranges from about 10 hours to about 20 hours.

15. A method for making an active material for an electrode, the method comprising:

obtaining a carbon black particle having a concentric crystallite structure with an at least partially amorphous carbon core and a graphitic carbon shell surrounding the at least partially amorphous carbon core;

exposing the carbon black particle to any of a heat treatment, a chemical treatment, or an electrochemical treatment, thereby removing the at least partially amorphous carbon core to form a hollow carbon material; and incorporating tin into a hollow core of the hollow carbon material, thereby forming a hollow carbon composite, wherein the incorporating of the tin into the hollow core of the hollow carbon material is accomplished by:

exposing the hollow carbon material to a solution including a tin precursor using an incipient wetness impregnation technique;

drying the hollow carbon material;

exposing the dried hollow carbon material to annealing to reduce the tin precursor and form a product including the tin in the hollow core of the hollow carbon material;

cooling the product in an $H_2/Ar$ atmosphere; and gradually exposing the product to air.

16. A method for making an active material for an electrode, the method comprising:

obtaining a carbon black particle having a concentric crystallite structure with an at least partially amorphous carbon core and a graphitic carbon shell surrounding the at least partially amorphous carbon core;

exposing the carbon black particle to any of a heat treatment, a chemical treatment, or an electrochemical treatment, thereby removing the at least partially amorphous carbon core to form a hollow carbon material; and incorporating tin oxide into a hollow core of the hollow carbon material, thereby forming a hollow carbon composite, wherein the incorporating of the tin oxide into the hollow core of the hollow carbon material is accomplished by:

exposing the hollow carbon material to a solution including a tin precursor using an incipient wetness impregnation technique;

drying the hollow carbon material;

exposing the dried hollow carbon material to annealing to reduce the tin precursor and form a product including the tin in the hollow core of the hollow carbon material;

cooling the product in an $H_2/Ar$ atmosphere; and exposing the product to annealing in air or an oxidizing environment.

17. The method as defined in claim 12 wherein the heat treatment includes exposing the carbon black particle to i) air or ii) a controlled environment including from about 5% to about 50% of oxygen gas and from about 50% to about 95% of an inert gas, at a temperature ranging from about 200° C. to about 550° C. and for a time ranging from about 1 hour to about 10 hours.

18. The method as defined in claim 12 wherein:
the chemical treatment includes reacting the carbon black particle with an inorganic acid;
the inorganic acid is selected from $HNO_3$ and $H_2SO_4$;
a concentration of the inorganic acid ranges from about 40% to about 75%; and
a reaction time is at least 20 hours.

19. The method as defined in claim 12 wherein the electrochemical treatment includes electrochemically reacting the carbon black particle with a 0.05M to 1M $HClO_4$ solution at a temperature ranging from about 25° C. to about 550° C. and for a time ranging from about 2 hours to about 10 hours.

\* \* \* \* \*